United States Patent
Zhang et al.

(10) Patent No.: US 12,274,245 B1
(45) Date of Patent: Apr. 15, 2025

(54) NOZZLE DEVICE ASSEMBLY FOR AUTOMATIC FEEDING IN DEEP-WATER AQUACULTURE AND FEEDING SYSTEM THEREOF

(71) Applicant: Yellow Sea Fisheries Research Institute, Chinese Academy Of Fishery Sciences, Qingdao (CN)

(72) Inventors: Tianshi Zhang, Qingdao (CN); Siqing Chen, Qingdao (CN); Li Bian, Qingdao (CN); Juanwen Yu, Qingdao (CN); Jinchao Zhu, Qingdao (CN)

(73) Assignee: Yellow Sea Fisheries Research Institute, Chinese Academy Of Fishery Sciences, Qingdao (CN)

( * ) Notice: Subject to any disclaimer, the term of this patent is extended or adjusted under 35 U.S.C. 154(b) by 0 days.

(21) Appl. No.: 18/901,541

(22) Filed: Sep. 30, 2024

(30) Foreign Application Priority Data

Oct. 11, 2023 (CN) .......................... 202311308685.1

(51) Int. Cl.
*A01K 61/80* (2017.01)

(52) U.S. Cl.
CPC .................................. *A01K 61/80* (2017.01)

(58) Field of Classification Search
CPC ...... A01K 61/80; A01K 61/85; A01K 63/003; A01K 63/006
USPC .............................. 119/210, 212, 230, 51.04
See application file for complete search history.

(56) References Cited

U.S. PATENT DOCUMENTS

| | | | | |
|---|---|---|---|---|
| 4,359,014 A | * | 11/1982 | Molaug | A01K 61/80 119/51.04 |
| 5,150,666 A | * | 9/1992 | Momont | A01K 5/02 222/394 |

FOREIGN PATENT DOCUMENTS

| | | | | |
|---|---|---|---|---|
| CN | 103598131 A | | 2/2014 | |
| CN | 203563542 U | | 4/2014 | |
| CN | 106069966 A | | 11/2016 | |
| CN | 205848366 U | | 1/2017 | |
| CN | 207665819 U | | 7/2018 | |
| CN | 111134068 A | * | 5/2020 | ............ A01K 61/80 |
| CN | 214853690 U | | 11/2021 | |
| JP | 2020195331 A | | 12/2020 | |

(Continued)

OTHER PUBLICATIONS

Translation of CN111134068 A (Year: 2020).*

*Primary Examiner* — Peter M Poon
*Assistant Examiner* — Danielle A Clerkley
(74) *Attorney, Agent, or Firm* — JEEN IP LAW, LLC

(57) ABSTRACT

The present invention relates to a nozzle device assembly for the automatic feeding in deep-water aquaculture and feeding system thereof and belonging to technical field of aquaculture device. It comprises a conical nozzle and a feeding pipe joint, wherein the feeding pipe joint further comprises a vacuum chamber, a bait inlet and a feeding pipe interface, the bait inlet is provided on the side wall of the vacuum chamber, wherein the junction between vacuum chamber and feeding pipe interface is an arc-shaped transition zone, wherein a cavity is formed between conical nozzle and vacuum chamber wall. The present invention also provides a feeding system equipped with the nozzle device assembly. It can keep the water velocity from the nozzle constant, so as to transport the bait to the deep-water cage 10 meters underwater. The bait is evenly dispersed in conveying water body.

3 Claims, 5 Drawing Sheets

(56) References Cited

FOREIGN PATENT DOCUMENTS

| | | | |
|---|---|---|---|
| TW | I742859 B | 10/2021 |
| TW | I747637 B | 11/2021 |

* cited by examiner

NOZZLE DEVICE ASSEMBLY FOR AUTOMATIC FEEDING IN DEEP-WATER AQUACULTURE AND FEEDING SYSTEM THEREOF

CROSS-REFERENCE TO RELATED APPLICATIONS

This application claims priority to Chinese Patent Application No. 202311308685.1, filed Oct. 11, 2023, which is hereby incorporated by reference in its entirety.

TECHNICAL FIELD

The present invention relates to technical field of aquaculture device, specifically a nozzle device assembly for automatic feeding in deep-water aquaculture and feeding system thereof.

BACKGROUND

In recent years, cage aquaculture in deep water has developed rapidly. In view of the fact that capacity of a single cage required for deep-water aquaculture is generally large, when feeding aquatic animals cultured in deep-water cages, in order to prevent the bait from drifting out of the cages with the water flow, the bait needs to be transported to a certain depth underwater. Especially before the arrival of a typhoon, the aquaculture cages need to be sunk to 10 meters below sea level. At this stage, a feeding system is required that can transport bait to less than 10 meters underwater. The feeding machines in the prior art mainly include gravity feeding machines, centrifuge feeding machines, pneumatic feeding machines, etc. However, the gravitational, centrifugal and pneumatic conveying generally use gravity, centrifugal force and airflow to scatter and blow feed particles through the pipe. However, the above feeding methods may have problems such as short blowing distance, too small turning angle of the feeding pipe, or inability to blow large particles of feed. In addition, the particles can be easily damaged, leaving a large amount of dust and oil residue in the pipeline which requires regular cleaning, thus raising operation as well as maintenance costs and increasing downtime of the device. The Chinese patent application with the Publication Number 2022108845890 discloses a pneumatic feeding machine which mainly utilizes the Venturi effect. A pressure reduction will occur near high-speed flowing gas, thereby automatically adsorbing the bait. However, this feeding method is mainly used for industrial as well as pond feeding on land, and it is impossible to feed the bait to desired location in deep-water aquaculture below 10 meters underwater.

The "Design and Experimental Research of Cage Feeding Machine" disclosed by SONG Xiefa et al. discloses a feeding machine for cage aquaculture in deep-water. This feeding machine utilizes hydraulic circulation to supply bait, hydraulic pumping to suck bait, hydrodynamic force to cast bait, etc., making full use of abundant seawater resources. The gasoline engine water pump is used as the power to throw the bait to the cage through pipeline, and the bait can be supplied to multiple cages at different distances. However, after hydrodynamic force in this technical solution comes out from nozzle, it enters the feed pipeline with a wider pipe diameter, which reduces the kinetic energy of water flow. Therefore, it can transport bait horizontally or meet the feeding needs in deep-water aquacultural cages with a small depth, but it cannot cast the bait to required position of the aquatic organisms cultured in cages below 10 meters underwater.

SUMMARY

In view of the above technical problems, the present invention discloses a nozzle device assembly for automatic feeding in deep-water aquaculture and feeding system thereof. The nozzle device assembly of present invention allows the water flow from the nozzle to maintain its initial speed after sucking in bait and then enter feed pipe, so that the bait can be fed to required position of aquatic organisms cultured in the cage at a long distance and below 10 meters underwater. The device of present invention is easy to assemble and possesses no requirements on position of bait inlet.

To achieve above objectives, technical solution adopted by present invention is as follows:

Nozzle device assembly for automatic feeding in deep-water aquaculture which comprises a conical nozzle and a feeding pipe joint, wherein conical nozzle is tubular cone and feeding pipe joint further comprises a vacuum chamber, a bait inlet as well as a feeding pipe interface, wherein the diameter of vacuum chamber is larger than diameter of feeding pipe interface and the bait inlet is provided on the side wall of the vacuum chamber, wherein junction between vacuum chamber and feeding pipe interface is an arc-shaped transition zone, wherein diameter of conical nozzle is equal to diameter of feeding pipe interface, wherein a cavity is formed between conical nozzle and vacuum chamber wall after conical nozzle is inserted into vacuum chamber.

The present invention also provides a feeding system using nozzle device assembly for automatic feeding which comprises a feeding bin, a nozzle device assembly for automatic feeding and a delivery pipe, wherein a feeding pipe is connected under feeding bin, wherein lower end of feeding pipe is connected with the feeding inlet on joint of delivery pipe, and wherein the delivery pipe is connected with the delivery pipe interface on nozzle device assembly for automatic feeding.

Furthermore, the feeding pipe is connected with the water inlet pipe.

The present invention also provides a method of operation for running the feeding system, wherein the feed is premixed with water from feeding pipe when feeding with the feeding system, wherein the feeding pipe is closed at the same time by water mixture to form a closed cavity in the vacuum chamber, wherein the feeding pipe is connected with the water inlet pipe, and wherein the ratio of feed mass to water mass injected per minute is 1:9-1:6.

Furthermore, inner diameter of the vacuum chamber is 118 mm and its length is 190 mm, inner diameter of conical nozzle is 118 mm and its length is 170 mm, inner diameter of the delivery pipe interface is 63 mm and its length is 265 mm, diameter of water inlet pipe is 20 mm which its water inlet amount can be controlled, diameter of feeding pipe mouth is 100 mm, and a 7.5 kw water pump and a 63 mm diameter delivery pipe are selected.

Compared with the prior art, the beneficial effects of the present invention are as follows:

The present invention sets a transition zone and sets the transition zone into an arc shape, which on the one hand increases the area of contact between bait and water, so that the bait can be fully dispersed in the conveying water body. On the other hand, gap between the front end of the conical nozzle and the feed pipe is enlarged, so that device can adapt to feeds of any particle size without the occurrence of material jamming.

The present invention sets diameter of the small mouth end of the nozzle to the same size as diameter of the feed pipe, so that the water speed coming out of the nozzle remains unchanged, thereby conveying the bait to the deep-water cage below 10 meters underwater.

During use, feeding system of the present invention forms a closed vacuum chamber by conical nozzle, vacuum chamber wall, feed pipe and delivery pipe filled with water and bait. The vacuum chamber sucks back bait in the feeding pipe, so that bait quickly enters vacuum chamber. The water flow continuously ejected from the conical nozzle drives the bait in the vacuum chamber into the delivery pipe, so that the bait is in vacuum chamber and evenly dispersed in the conveying water body through the arc-shaped transition zone, thereby increasing the contact area and volume of the bait with water, and the bait conveying speed is fast. When a 7.5 KW water pump is used to convey bait to a cage at a depth of 10 meters, the speed can reach nearly 10 kg/min.

Among them: 1, vacuum chamber, 2, feeding inlet, 3, delivery pipe interface, 4, arc-shaped transition area, 5, cavity, 6, feeding bin, 7, delivery pipe, 8, water inlet pipe.

DESCRIPTION OF EMBODIMENTS

The present invention will be described more fully hereinafter with the reference to the accompanying drawings. However, embodiments described below are not intended to limit scope of present invention in any shape or form.

Embodiment 1

A nozzle device assembly for automatic feeding as shown in FIG. 1 to 4 which includes conical nozzle and delivery pipe joint. The conical nozzle is a tubular cone. The delivery pipe joint includes vacuum chamber 1, feeding inlet 2 and delivery pipe interface 3. The diameter of vacuum chamber is larger than the diameter of delivery pipe interface. The feeding inlet is provided on the side wall of vacuum chamber. The junction of vacuum chamber and delivery pipe interface is arc-shaped transition zone 4. Diameter of the small mouth end of conical nozzle is equal to diameter of delivery pipe interface. Cavity 5 is formed between conical nozzle as well as vacuum chamber wall after conical nozzle is inserted into vacuum chamber.

Embodiment 2

Figure 1:
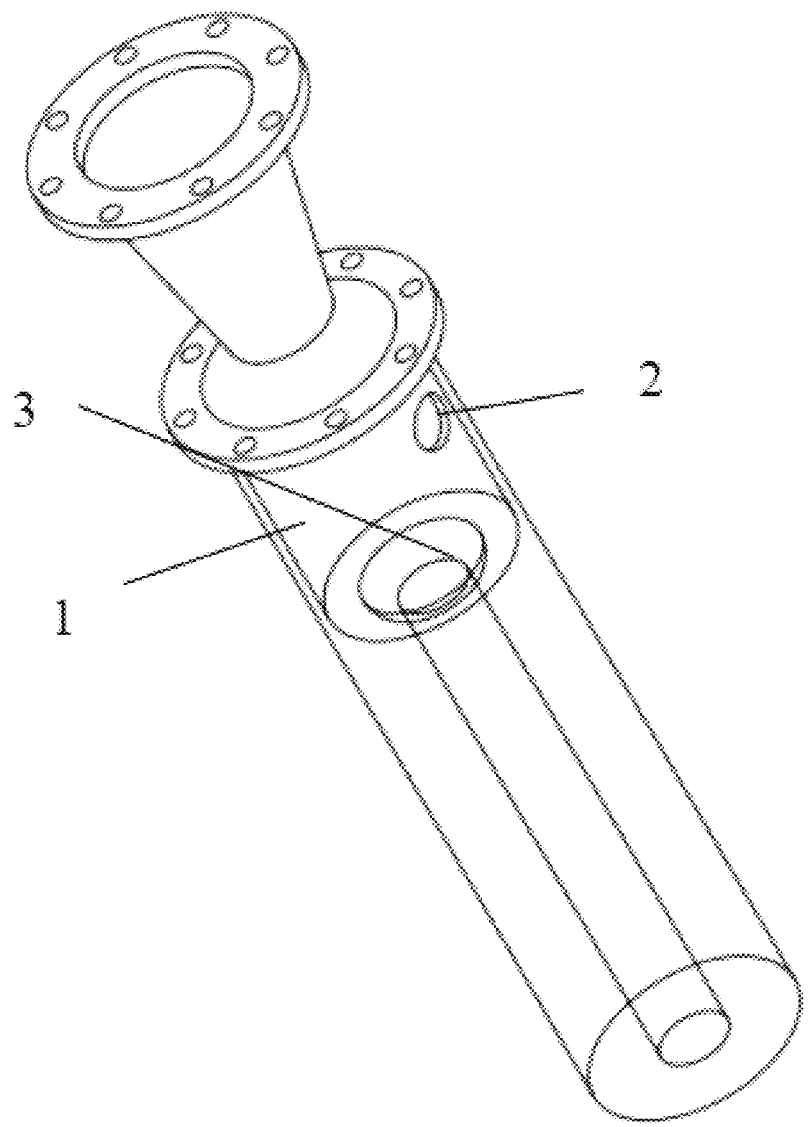
FIG. 1 is a schematic diagram showing structure of joint assembly of present invention.
Figure 2:
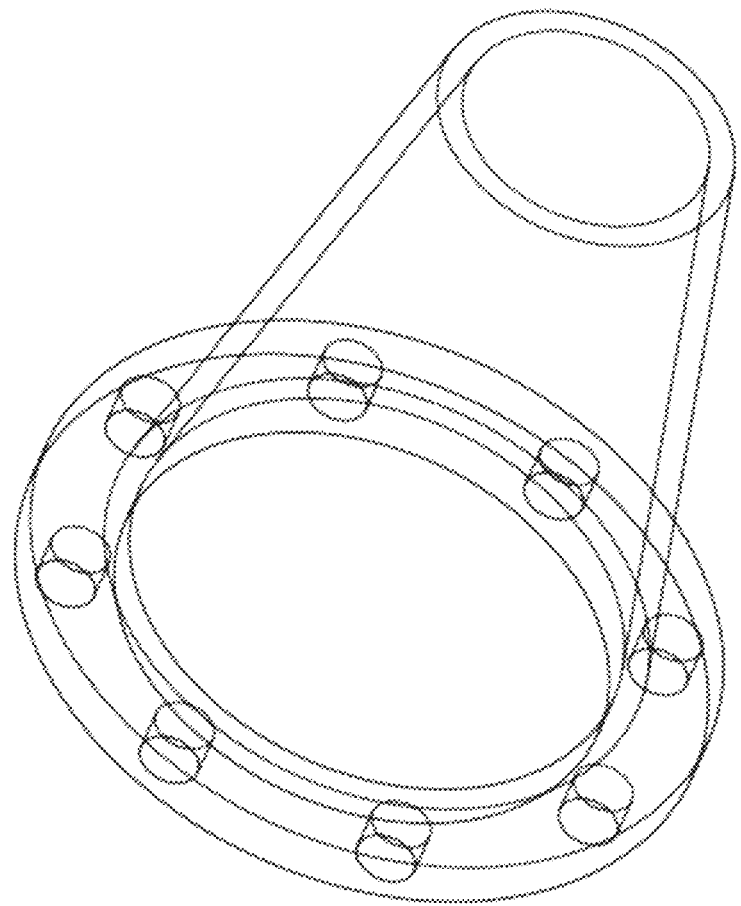
FIG. 2 is a schematic diagram showing structure of conical nozzle of present invention.
Figure 3:
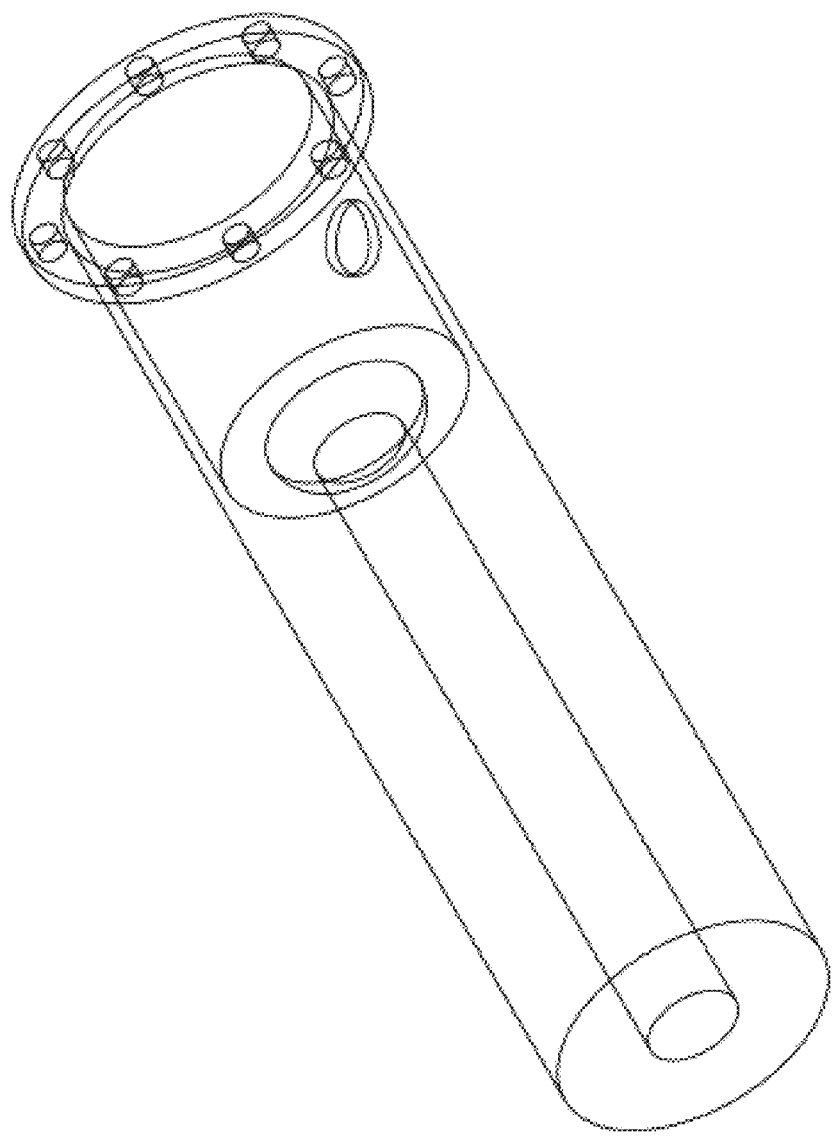
FIG. 3 is a schematic diagram showing structure of delivery pipe joint of present invention.
Figure 4:
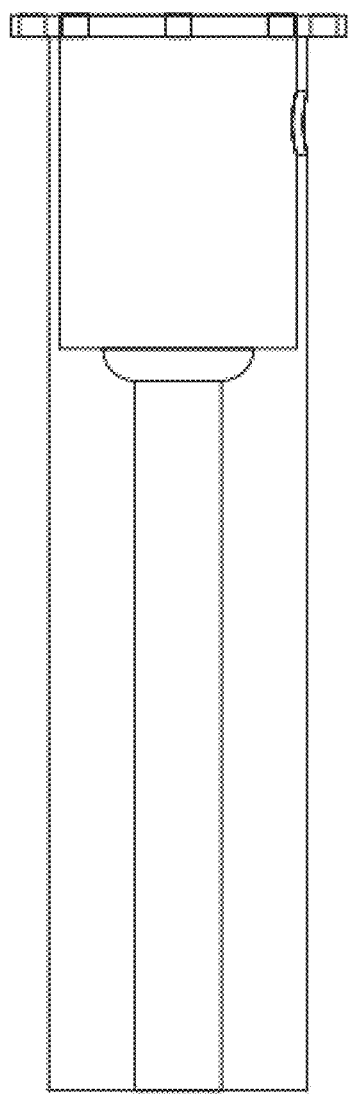
FIG. 4 is a schematic diagram showing cross-sectional structure of joint of delivery pipe of present invention.
Figure 5:
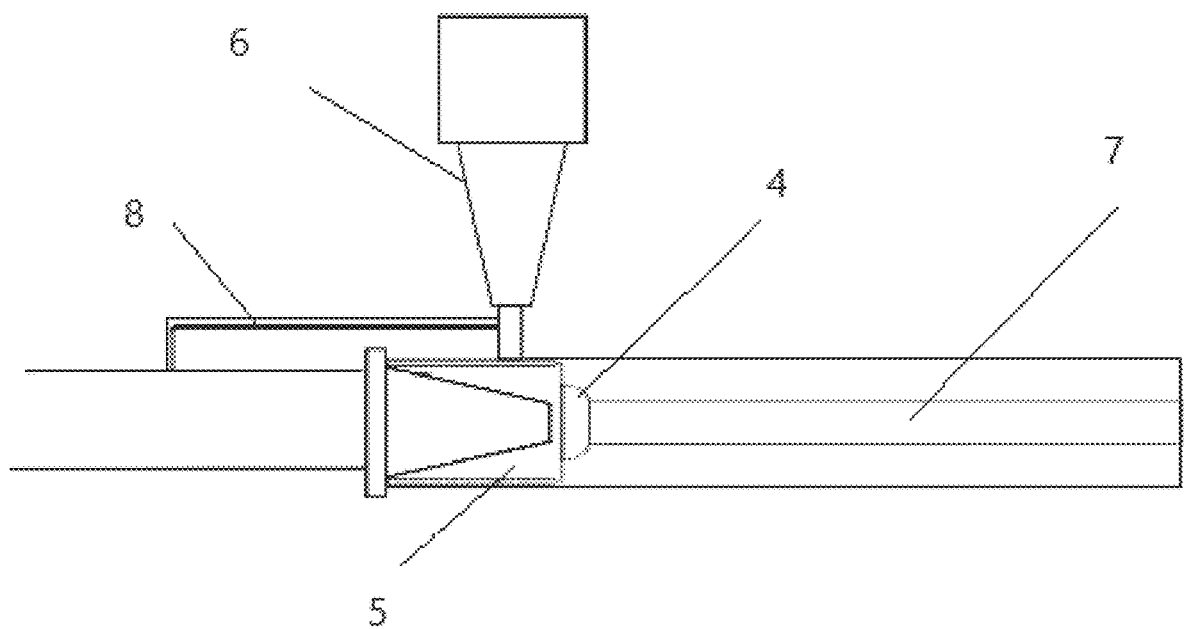
FIG. 5 is a schematic diagram showing structure of feeding system of present invention.

An automatic feeding system as shown in FIG. 5 which comprises feeding bin 6, nozzle device assembly for automatic feeding and delivery pipe 7.

The assembly includes conical nozzle and delivery pipe joint. Conical nozzle is tubular cone. Delivery pipe joint includes vacuum chamber, feeding inlet as well as delivery pipe interface. The diameter of vacuum chamber is larger than the diameter of delivery pipe interface. The feeding inlet is provided on side wall of vacuum chamber. The junction of vacuum chamber and delivery pipe interface is arc-shaped transition zone. The minimum diameter of conical nozzle is equal to diameter of delivery pipe interface. Small mouth end of conical nozzle is flush with front end of vacuum chamber, wherein the phrase "front" represents forward direction of the water flow. Cavity is formed between conical nozzle as well as vacuum chamber wall after conical nozzle is inserted into vacuum chamber.

The feeding bin is connected with feeding inlet pipe below. The lower end of feeding inlet pipe is connected with feeding inlet on delivery pipe joint. Delivery pipe is connected with delivery pipe interface on nozzle device assembly for automatic feeding. Feeding inlet pipe is connected with water inlet pipe 8.

Embodiment 3: Test of Feed and Water Ratio

The present embodiment provides an automatic feeding system for deep-water cage which its structure is as shown in Embodiment 2. The automatic feeding device requires a feeding bin to feed it. The upper half part of feeding bin is cylindrical, and the lower half part of it is conical. The total height of feeding bin is 1520 mm, the cylindrical height is 1330 mm, the diameter is 1600 mm and the conical height is 190 mm. The inner diameter of vacuum chamber is 118 mm and the length is 190 mm. The inner diameter of conical nozzle is 118 mm and the length of it is 170 mm. The inner diameter of pipeline of delivery pipe interface is 63 mm and the length of it is 265 mm. The De63 pipeline is connected by a transition at feeding outlet. Diameter of pipeline of water inlet pipe is 20 mm which its quantity of water intake can be controlled. The diameter of feeding pipe mouth is 100 mm, and a plectrum is set at upper end of feeding pipe to control feed output, thereby realizing mixing of feed and water in fixed ratio and ensuring that the feeding process is carried out smoothly.

The automatic feeding nozzle assembly, water pump, electrical supply as well as pipeline are connected and assembled into a deep-water cage below 10 meters of water surface for feeding. The automatic feeding machine for deep-water cage selects 7.5 kw water pump and 63 mm caliber delivery pipeline, and discharge pipeline selects De63 soft pipeline. By controlling the feed output in feeding bin and the water inlet of water inlet pipe on feeding pipe, the control variable method is used to continue the test, only ratio of water to feed is changed, and weight ratio of water to feed is continuously mixed according to the ratios from 1:1 to 1:9. The result shows that the feed would be blocked in pipeline only under ratios of 1:1 as well as 1:2 and can pass through pipeline under rest of above-mentioned ratios. The experimental results show that weight ratio of 1:6 has fastest suction speed.

Embodiment 4: Test Results for Feed Delivery Speed

This embodiment provides an automatic feeding system for the deep-water cage which its structure is as shown in Embodiment 2 and 3. A 1:6 weight ratio of water to feed is used, the water pump power of the feeding device is changed, and the situation of feed delivery is checked:

1. Mixing 8 mm particle feed with water (weight ratio is 1:6), turning on water pump with maximum power of 1 to 7.5 KW, measuring suction amount and time, repeating experiment 3 times, and then using the formula $V=G/T$ to calculate suction speed of the feeding device.

2. Conducting experiment using control variable method by changing only power of water pump and keeping other conditions unchanged. The following results in Table 1 can be obtained.

TABLE 1

Comparison of Suction Speeds of Feeding Device under Different Powers

| Power of Feeding Device | 1 KW | 2.75 KW | 3.75 KW | 5.6 KW | 7.5 KW |
|---|---|---|---|---|---|
| Suction Rate | Unable to suck feed | 4.62 kg/min<br>4.61 kg/min<br>4.58 kg/min | 6.00 kg/min<br>6.05 kg/min<br>6.02 kg/min | 6.67 kg/min<br>6.65 kg/min<br>6.68 kg/min | 12.0 kg/min<br>11.8 kg/min<br>12.3 kg/min |

When power of water inlet pump of automatic feeding device is 1 KW, the force of suction pipeline is extremely weak, and the suction force generated by feeding device cannot suck the feed into pipeline smoothly. Therefore, in actual production, when the power of water inlet pump is too low, automatic feeding device cannot operate normally. As power of water inlet pump of automatic feeding device continues to increase, its suction speed increases as well. When automatic feeding device is turned on at different powers, the impact on feed delivery speed is significantly different ($P<0.05$).

Embodiment 5: The Effect of Different Water Depths and Different Power of Feeding Device on Suction Speed During Feeding This embodiment provides an automatic feeding system for the deep-water cage which its structure is as shown in Embodiment 2 and 3. By designing different water depths for feeding and power of the water pump of feeding device, an experiment was conducted to investigate its impact on feeding speed. The specific results are as shown in Table 2.

TABLE 2

Test Results of the Water Depth on Suction Speed when Feeding Using Feeding Device

| Water Depth (m) | 3.75 KW | 5.6 KW | 7.5 KW |
|---|---|---|---|
| 3 | 9.35 kg/min<br>9.15 kg/min<br>9.40 kg/min | 10.60 kg/min<br>10.38 kg/min<br>10.90 kg/min | 14.71 kg/min<br>14.93 kg/min<br>15.42 kg/min |
| 6 | 7.98 kg/min<br>7.58 kg/min<br>7.88 kg/min | 9.79 kg/min<br>9.68 kg/min<br>9.88 kg/min | 13.25 kg/min<br>13.78 kg/min<br>13.45 kg/min |
| 10 | The feeding device is unable to suck the feed. | 7.05 kg/min<br>7.11 kg/min<br>6.83 kg/min | 9.10 kg/min<br>9.68 kg/min<br>9.60 kg/min |

The data analysis using SPSS software and Excel revealed that both power of water inlet pump and height of pipeline significantly influence the suction rate of the feeding device ($P<0.05$). The findings indicated that as the water depth decreases, suction speed decreases, and as the power of water inlet pump increases, suction speed increases.

What is claimed is:

1. A feeding system for automatic feeding in deep-water aquaculture comprising: a nozzle device assembly, a delivery pipe, and a feeding bin;
   wherein the nozzle device assembly comprises a conical nozzle and a feeding pipe joint,
   wherein the conical nozzle is in a shape of tubular cone, and the feeding pipe joint comprises a vacuum chamber, a bait inlet and a feeding pipe interface,
   wherein a diameter of the vacuum chamber is larger than a diameter of the feeding pipe interface; and the bait inlet is provided on a side wall of the vacuum chamber,
   wherein a junction between the vacuum chamber and the feeding pipe interface is an arc-shaped transition zone,
   wherein a diameter of the conical nozzle is equal to the diameter of the feeding pipe interface,
   wherein a cavity is formed between the conical nozzle and the side wall of the vacuum chamber after the conical nozzle is inserted into the vacuum chamber;
   wherein the delivery pipe is connected with a delivery pipe interface on the nozzle device assembly;
   wherein a feeding pipe is connected under the feeding bin, and the feeding pipe is connected with a water inlet pipe;
   wherein feed is pre-mixed with water from the feeding pipe when feeding with the feeding system, and the feeding pipe is closed by a mixture of water and the feed so as to form a closed cavity in the vacuum chamber;
   wherein an inner diameter of the vacuum chamber is 118 mm and a length of the vacuum chamber is 190 mm,
   wherein an inner diameter of the conical nozzle is 118 mm and a length of the conical nozzle is 170 mm,
   an inner diameter of the delivery pipe interface is 63 mm and a length of the delivery pipe interface is 265 mm,
   wherein a diameter of the water inlet pipe is 20 mm, and a water inlet amount of the water inlet pipe is controlled,
   wherein a diameter of a feeding pipe mouth is 100 mm, and the delivery pipe has a water pump of 7.5 kw and a diameter of 63 mm.

2. The feeding system for automatic feeding in deep-water aquaculture according to claim 1,
   wherein a lower end of the feeding pipe is connected with a feeding inlet on a joint of the delivery pipe.

3. The feeding system for automatic feeding in deep-water aquaculture according to claim 2, wherein a ratio of feed mass to water mass injected per minute is 1:9-1:6.

* * * * *